(12) United States Patent
Gennasio et al.

(10) Patent No.: US 9,903,520 B2
(45) Date of Patent: Feb. 27, 2018

(54) QUICK COUPLING DEVICE FOR PRESSURIZED FLUID

(71) Applicant: ALFA GOMMA S.p.A., Vimercate (Monza Brianza) (IT)

(72) Inventors: Enrico Gennasio, Vimercate (IT); Stefano Mazzoli, Mezzago (IT); Rinaldo Doi, Merlino (IT)

(73) Assignee: ALFA GOMMA S.P.A., Vimercate (Monza Brianza) (IT)

( * ) Notice: Subject to any disclaimer, the term of this patent is extended or adjusted under 35 U.S.C. 154(b) by 11 days.

(21) Appl. No.: 14/782,057

(22) PCT Filed: Apr. 2, 2014

(86) PCT No.: PCT/EP2014/056627
§ 371 (c)(1),
(2) Date: Oct. 2, 2015

(87) PCT Pub. No.: WO2014/161907
PCT Pub. Date: Oct. 9, 2014

(65) Prior Publication Data
US 2016/0040815 A1    Feb. 11, 2016

(30) Foreign Application Priority Data
Apr. 5, 2013    (IT) .................. MI13A0525

(51) Int. Cl.
*F16L 37/32*    (2006.01)
*F16L 37/35*    (2006.01)
(Continued)

(52) U.S. Cl.
CPC ............... *F16L 37/32* (2013.01); *F16L 15/08* (2013.01); *F16L 21/08* (2013.01); *F16L 29/04* (2013.01); *F16L 37/34* (2013.01); *F16L 37/35* (2013.01)

(58) Field of Classification Search
CPC .. F16L 37/28; F16L 37/30; F16L 37/32; F16L 37/34; F16L 37/35; F16L 21/08; F16L 15/08; F16L 29/04
(Continued)

(56) References Cited

U.S. PATENT DOCUMENTS 5,662,141 A * 9/1997 Arosio .................... F16L 29/04
137/614.03
6,082,399 A * 7/2000 Nyberg .................... F16L 37/23
137/614.03
(Continued)

FOREIGN PATENT DOCUMENTS

CH       159999 A    2/1933
EP      0542342 A1   5/1993
(Continued)

OTHER PUBLICATIONS

PCT International Search Report issued in corresponding PCT Application No. PCT/EP2014/056627.

*Primary Examiner* — Ian Paquette
(74) *Attorney, Agent, or Firm* — Troutman Sanders LLP

(57) ABSTRACT

A quick coupling device for pressurized fluid, comprising a male coupling (2), a first adapter (36) applied to said male coupling (2) for connection to a first external element, a female coupling (1) associable with the male coupling (2), a second adapter (20) applied to said female coupling (1) for connection to a second external element, at least one adapter (36, 20) being made as an axially hollow piece exhibiting a first portion (100) having a cylindrical external cross section and at least a second portion (101) coaxial to the first portion (100) and having a polygonal external cross section, the polygonal external cross section of the second portion (101) being inscribed along the axial generatrices of the cylindrical external cross section of the first portion (100).

12 Claims, 1 Drawing Sheet

(51) Int. Cl.
  *F16L 29/04* (2006.01)
  *F16L 37/34* (2006.01)
  *F16L 15/08* (2006.01)
  *F16L 21/08* (2006.01)

(58) Field of Classification Search
  USPC ................................. 137/614.02–614.06
  See application file for complete search history.

(56) References Cited

U.S. PATENT DOCUMENTS

| | | | | |
|---|---|---|---|---|
| 6,681,803 B2 * | 1/2004 | Taneya | ............... | F16L 37/23 |
| | | | | 137/614.03 |
| 7,165,576 B2 * | 1/2007 | Carmack | ............ | F16L 37/32 |
| | | | | 137/614 |

FOREIGN PATENT DOCUMENTS

| | | | |
|---|---|---|---|
| FR | 2667923 A1 | 4/1992 | |
| WO | WO 9014547 A1 * | 11/1990 | ............ F16L 37/32 |
| WO | 2007/014944 A1 | 2/2007 | |

* cited by examiner

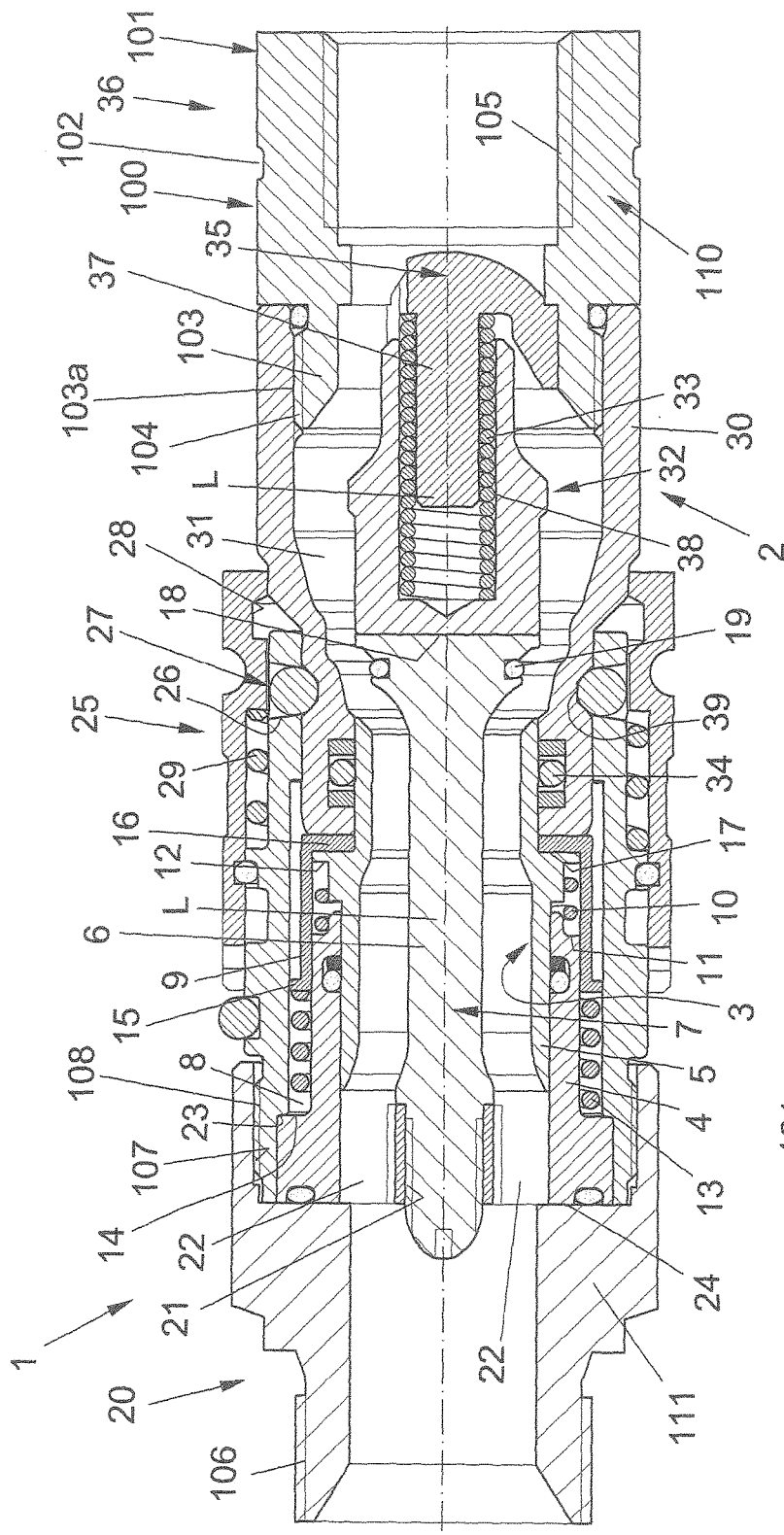
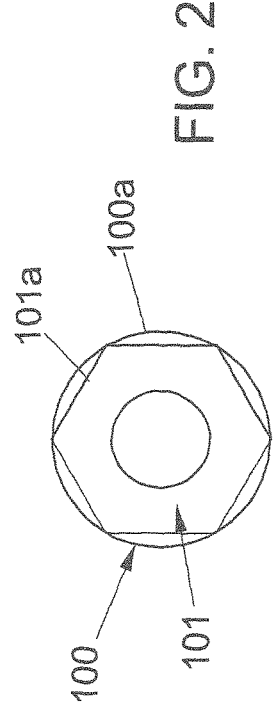
FIG. 1
FIG. 2

QUICK COUPLING DEVICE FOR PRESSURIZED FLUID

CROSS-REFERENCE TO RELATED APPLICATIONS

This application is the U.S. National Phase of International Patent Application Serial No. PCT/EP2014/056627, filed on Apr. 2, 2014, which claims priority to Italian Patent Application No. MI2013A000525, filed on Apr. 5, 2013. The contents of the foregoing applications are hereby incorporated by reference in their entireties.

The present invention relates to a quick coupling device for pressurised fluids, particularly a hydraulic one, usable in agricultural and industrial applications.

More in particular, reference is made to a quick coupling device comprising an associable male coupling and female coupling, each provided with a valve body having an axial cavity in which a shutter stem is positioned.

In the commercially available versions of quick coupling devices, the valve body of the male coupling generally has an adapter directly applied to it, the adapter having a female thread on the outlet side for connecting to an external element, whilst the valve body of the female coupling generally has an adapter directly applied to it which, on the outlet side, has a female thread that requires, however, a further adapter having a male thread on the outlet side for connecting to a pipe. This provision of a double adapter for the connection to a pipe requires a sealing system also between the due adapters.

In some applications, where a number of hydraulic circuits are required together, a plurality of quick coupling devices is provided, all of which to be installed in a single box-like support that has limited, non-modifiable standard dimensions. Installation of the quick coupling devices in the box-like support is hindered by the limited availability of room for manoeuvre existing between the quick coupling devices themselves.

There are generally strict constraints that require, for installation, the use of tools that are not special but rather commonly available in the market, such as wrenches or the like.

To facilitate installation, consequently, it is not possible to provide special tools with reduced dimensions.

To simplify installation it is not even possible to take steps to reduce the dimensions of the devices so as to produce a reduction in the opening for the passage of fluid, since this would result in a considerable penalisation of flow with unacceptable pressure drops.

The technical task that the present invention sets itself is thus to realize a quick coupling device for pressurised fluids which enables the aforementioned technical drawbacks of the prior art to be overcome.

Within the scope of this technical task, one object of the invention is to realise a quick coupling device for pressurised fluids which enables the installation thereof to be simplified, even with limited room for manoeuvre.

Another object of the invention is to provide a quick coupling device for pressurised fluids which ensures an optimisation of the pressure drops by also reducing the hydraulic sealing points that represent points of a potential leakage of fluid.

Another object of the invention is to realise a quick coupling device for pressurised fluids which provides a high standard of performance over a longer time.

The technical task, as well as these and other objects, according to the present invention, are achieved by realising a quick coupling device for pressurised fluid comprising a male coupling, a first adapter applied to said male coupling for connection to a first external element, a female coupling associable with the male coupling, a second adapter applied to said female coupling for connection to a second external element, at least one between said first and second adapter being made as an axially hollow piece exhibiting a first portion having a cylindrical external cross section and at least a second portion coaxial to the first portion and having a polygonal external cross section, characterised in that said polygonal external cross section of said second portion is inscribed along the axial generatrices of the cylindrical external cross section of said first portion.

The present invention further discloses a procedure for the realisation of an adapter for a coupling of a quick coupling device for pressurised fluid, characterised in that it supplies a cylindrical piece having a first external diameter, and obtains by removal of material, in a position adjacent to a first cylindrical portion of said piece having said first external diameter, a second portion of said piece having a polygonal external cross section inscribed along the axial generatrices of the cylindrical external cross section of said first cylindrical portion of said piece.

Advantageously, the adapter has a more compact external configuration which enables easier installation of the coupling device without modifying the opening for the passage of fluid.

Advantageously, moreover, providing for the valve body of the female coupling an adapter having a male thread on the outlet side eliminates the necessity of having a further adapter and consequently a further potential point of leakage in the connection to a pipe.

Other features of the present invention are defined, moreover, in the subsequent claims.

Additional features and advantages of the invention will be more apparent from the description of a preferred but non-exclusive embodiment of the quick coupling device according to the invention, illustrated by way of nonrestrictive example in the appended drawings, in which:

FIG. 1 shows an axial section view of a quick coupling device according to the invention, in which the male quick coupling and the female quick coupling are connected; and FIG. 2 shows a front view of the adapter applied to the male coupling.

With reference to the aforementioned figures, there is shown a quick coupling device comprising a male hydraulic quick coupling 2, a first adapter 36 applied to the male coupling 2 for connection of the latter to a first external element (not shown), a female hydraulic quick coupling 1, and a second adapter 20 applied to the female coupling 1 for connection of the latter to a second external element (not shown).

The female coupling 1 comprises a longitudinal hollow valve body 3 having at least a first valve body part 4 and a second valve body part 5 that is coaxially movable with respect to the first valve body part 4, and a shutter stem 6 positioned in the valve body 3 coaxially to the longitudinal axis L of the valve body 3.

The male coupling 2 comprises a valve body 30 extending along a longitudinal axis L and having a cavity 31 that extends axially for the entire length of the valve body 30, and a shutter stem 32 with a flat head positioned in the cavity 31 coaxially to the axis L.

At least one between the first adapter 36 and the second adapter 20, and in particular at least the first adapter 36, is made as an axially hollow piece 110 exhibiting a first portion 100 having a cylindrical external cross section 100a and at least a second portion 101 coaxial to the first portion 100 and having a polygonal, in particular hexagonal, external cross section 101*a*.

The first portion 100 is obtained at the end of the first adapter 36 opposite the one for fixing to the valve body 30.

The polygonal external cross section 101*a* of the second portion 101 is inscribed along the axial generatrices of the cylindrical external cross section 100*a* of the first portion 100.

The piece 110 has an external circumferential perimeter groove 102 that separates the first portion 100 from the second portion 101.

The piece 110 also has a third portion 103 having a cylindrical external cross section 103*a* with a smaller diameter than the cylindrical external cross section 100*a* of the first portion 100.

The third portion 103 has a male thread 104 by means of which the piece 110 is directly connected to a female thread of the valve body 30 of the male coupling 2.

Finally, the piece 110 has a female thread 105 for connection to the first external element.

The female thread 105 partly occupies the inside surface of the first portion 100 and entirely occupies the inside surface of the second portion 101.

Advantageously, the diameter of the hexagonal external cross section 101*a* of the second portion 101 of the piece 110 has a standard size compatible for gripping with a tool commonly available on the market, for example a standard wrench.

The procedure for the realisation of the first adapter 36 envisages obtaining the piece 110 from a cylindrical blank workpiece having the external diameter of the first portion 100 of the final piece 110, machining to remove material so as to obtain, at one end of the workpiece, the second portion 101 of the final piece 110, machining to remove material so as to obtain, at the opposite end of the workpiece, the third portion 103 of the final piece 110, machining to remove material from the cylindrical bar so as to obtain the groove 102 of the final piece 110 if provided for, axially perforating the workpiece, and forming the male thread 104 and the female thread 105. These machining operations can also be performed in a different chronological order.

The first adapter 36 thus formed has smaller external dimensions than a traditional adapter obtained from a prismatic blank workpiece having the same external diameter as the cylindrical workpiece used in accordance with the invention, from which the two cylindrical portions of different diameter are then obtained by removal of material.

The special production technique makes it possible to reduce the external dimensions of the first adapter 36, the internal opening for the passage of flow and mechanical strength being equal.

Consequently, without penalising other aspects, one obtains greater available room for manoeuvring the tools necessary for installing multiple quick coupling devices in a limited space of a box-like support typical of some applications.

The second adapter 20 is made in one piece 111 directly connected to the female coupling 1.

The piece 111 has a female thread 107 connected to a male thread 108 present in a longitudinal hollow body 7 for containing the valve body 3, to which the valve body 3 itself is fixed.

The piece 111 has a male thread 106 for the outlet connection of the adapter 20 to the second external element.

Advantageously, in the event that the second external element is a pipe, it is possible to connect the pipe directly to the female coupling 1 with the aid solely of the adapter 20: unlike traditional solutions, which, due to the fact of envisaging an adapter with a female thread on the outlet side directly connected to the female coupling, would require a second adapter serially connected via a sealing system to the first adapter, the solution adopted according to the invention enables one adapter and sealing system to be dispensed with.

In the female coupling 1 the longitudinal hollow body 7 for containing the valve body 3 is disposed coaxially to the valve body 3 and defines, with the valve body 3, a hollow space 8 in which a drive sleeve 9 for driving the second part 5 of the valve body 3 is disposed.

The sleeve 9 is oriented coaxially to the longitudinal axis L of the valve body 3 and has an internal flange 16 at its head end and an external flange 15 at its base end. The internal flange 16 of the sleeve 9 is engageable against a shoulder 17 of the second valve body part 5 for the driving thereof.

The second valve body part 5 is movable with respect to the first valve body part 4 in contrast and by action of a first helical spring 10 positioned in the hollow space 8 coaxially to the longitudinal axis L of the valve body 3 and interposed between the first valve body part 4 and the second valve body part 5.

More in particular, the first helical spring 10, is positioned between an external support shoulder 11 of the first valve body part 4 and an external support shoulder 12 of the second valve body part 5.

The sleeve 9 is instead movable with respect to the valve body 3 in contrast and by action of a second helical spring 13 positioned in the hollow space 8 coaxially and externally to the first helical spring 10 and interposed between the sleeve 9 and the first valve body part 4.

More in particular, the second helical spring 13 is positioned between an external support shoulder 14 of the first valve body part 4 and the external support flange 15 of the sleeve 9.

The stem 6 has a flat head 18 and a threaded base 21 screwed into a threaded hole 22 of a support with radial partitions 22 that extend in one piece in the cavity of the first valve body part 4, from the base end of the latter.

The first valve body part 4 is locked in position by virtue of the tightening of its base end against an internal shoulder 24 of the adapter 20, and of its external shoulder 14 against an internal shoulder 23 of the containing body 7.

In the position of closing off the passage of fluid through the cavity of the valve body 3, the head 18 of the stem 6 is perimetrically in contact with the head end of the valve body 3 and ensures a hydraulic seal via a gasket 19.

In the position of opening the passage of fluid through the cavity of the valve body 3, by virtue of the relative movement between the stem 6 and the valve body 3, the head 18 is detached and positioned forward relative to the head end of the valve body 3.

The containing body 7 has a locking ring 25 for securing the connection of the female coupling 1 with the male coupling 2, and conical through seats 26, where balls 27 are freely housed.

The locking ring 25 internally has a circumferential perimeter groove 28 alignable with the conical seats 26, and can be actuated in contrast and by action of a helical spring 29 interposed between the locking ring 25 and the containing body 7.

In the male coupling 2, the shutter stem 32 is movable with respect to the valve body 30 along the axis L, in contrast and by action of a helical spring 33, between a position of opening and a position of closing off an axial passage of fluid through the cavity 31.

In the position of closing off the passage, the head end of the stem 32 and the head end of the valve body 30 are perimetrically in hydraulic sealing contact via a gasket 34.

In the position of opening the passage, by virtue of the relative movement between the stem 32 and the valve body 30, the head end of the stem 32 is detached and positioned rearward relative to the head end of the valve body 30.

A centring and guide element 35 for the stem 32 is fastened between the valve body 30 and the adapter 36.

The centring and guide element 36 comprises radial partitions that enable passage of the flow, and a pin 37 over which the stem 32 is fitted, with the interposition of the helical spring 33, the stem 32 being fitted with an axial cavity 38 for this purpose.

Guidance of the stem 32 is aided by valve body 30, which, at its head end, has an internal cylindrical lateral surface which is matable with an external cylindrical lateral surface of the stem 32.

The connection between the female quick coupling 1 and the male quick coupling 2 takes place in the following manner.

Prior to the connection, the quick-fit male coupling 2 is in a configuration in which the shutter 32 is maintained against the valve body 30 by the spring 33 so as to close off the axial passage of fluid through the valve body 30.

Prior to the connection, the female coupling 1 is in a configuration in which the spring 10 maintains the second part 5 of the valve body 3 extended against the head 18 of the shutter 6 in a position such as to close off the passage axial of fluid through the valve body 3, and in which the spring 13 maintains the sleeve 9 extended in a position flush with the head 18 of the shutter 6.

During the axial push of the operator to make the connection, the head end of the valve body 30 of the male coupling 2 comes into opposition with the internal flange 16 of the sleeve 9 of the female coupling 1 and pushes it, causing a retraction of the sleeve 9 relative to the second part 5 of the valve body 3. At a certain point during its retraction stroke, the sleeve 9 intercepts, with its internal flange 16, the external shoulder 17 of the second part 5 of the valve body 3, which in turn retracts relative to the shutter 6, thus opening the axial passage for the fluid through the valve body 3.

During the axial push of the operator to make the connection, moreover, the head end of the shutter 32 of the male coupling 2 comes into opposition with the head end 18 of the fixed shutter 6 of the female coupling 1, by which it is pushed so as to retract within the valve body 30 until opening the passage axial for the fluid through the valve body 30.

To secure the connection between the female coupling 1 and the male coupling 2 the locking ring 25 is actuated.

Initially, the groove 28 is aligned with the seats 26 in which the balls 27 are locked by virtue of the retention exerted by the sleeve 9. The balls 27 hold the locking ring 25 in position. The subsequent penetration of the male coupling 2 into the female coupling 1 causes a movement of the sleeve 9 until an external perimeter groove of the valve body 30 of the male quick coupling 2 aligns itself with the seats 26. In this coupling configuration, the balls 27 project into the groove 39 and free the locking ring 25, which as a result of the stretching of the spring 29, extends toward the male coupling 2. The extension of the locking ring 25 causes the groove 28 to be offset from the seats 26, with the consequence that the balls 27 remain trapped in the groove 39, which they no longer have the possibility of coming out of unless the locking ring 25 is retracted to realign the groove 28 with the seats 26.

The quick coupling thus conceived is susceptible of numerous modifications and variants, all falling within the scope of the inventive concept; moreover, all the details may be replaced with other technically equivalent ones.

In practice, all of the materials used, as well as the dimensions, can be any whatsoever according to need and the state of the art.

The invention claimed is:

1. A quick coupling device for pressurized fluid, comprising:
    a male coupling,
    a first adapter applied to said male coupling for connection to a first external element,
    a female coupling associable with the male coupling,
    a second adapter applied to said female coupling for connection to a second external element,
    wherein at least one among said first and second adapter being made as an axially hollow piece comprising:
        a first portion having a cylindrical external cross section,
        at least a second portion coaxial to the first portion and having a polygonal external cross section, and
        a third portion axially staggered from the first portion on an end opposite the second portion, comprising:
            a male thread screwed to a female thread disposed on the axially hollow piece, forming a portion of a cavity through which the pressurized fluid travels, and
            a cylindrical external cross section of a smaller diameter than that of said cylindrical external cross section of said first portion,
    wherein the first, second, and third portions are formed from a single piece, and
    wherein said polygonal external cross section of said second portion is inscribed along the axial generatrices of the cylindrical external cross section of said first portion.

2. The quick coupling device for pressurized fluid according to claim 1, wherein said male coupling comprises an axially hollow valve body and a shutter stem that are movable axially with respect to each other in contrast to and by action of an elastic element, and said female coupling comprises a axially hollow valve body and a shutter stem that are movable axially with respect to each other in contrast to and by action of an elastic element.

3. The quick coupling device for pressurized fluid according to claim 1, wherein said axially hollow piece has an external circumferential perimeter groove that separates said first portion from said second portion.

4. The quick coupling device for pressurized fluid according to claim 1, wherein said third portion is directly connected to said male coupling.

5. The quick coupling device for pressurized fluid according to claim 1, wherein said axially hollow piece has a female thread for direct connection to said first external element.

6. The quick coupling device for pressurized fluid according to claim 1, wherein said second adapter is directly connected to said female coupling and has a male thread at the outlet for direct connection to a pipe.

7. The quick coupling device for pressurized fluid according to claim 1, wherein said second adapter has a female thread wherethrough directly connected to the valve body of said female coupling.

8. The quick coupling device for pressurized fluid according to claim 1,
   wherein the axially hollow piece of the at least one of the first and second adapter comprises an external surface, and
   wherein the first portion comprises an outer surface flush with the external surface.

9. The quick coupling device for pressurized fluid according to claim 1, wherein said second portion of said piece has a hexagonal external cross section.

10. The quick coupling device for pressurized fluid according to claim 9, wherein the diameter of said hexagonal external cross section is of a standard size.

11. A method for the realization of an adapter for a coupling of a quick coupling device for pressurized fluid, comprising the steps of:
   supplying a cylindrical piece having a first external diameter, and being obtained by removal of material, in a position adjacent to a first cylindrical portion of said piece having said first external diameter, a second portion of said piece having a polygonal external cross section inscribed along the axial generatrices of the cylindrical external cross section of said first cylindrical portion of said piece,
   perforating axially, a third cylindrical portion of said piece having a second diameter smaller than said first diameter is obtained by removal of material, and there is obtained, at said third cylindrical portion of said piece, a male thread for connection of the adapter to the coupling, and at least at said second portion of said piece, a female thread for connection of the adapter to an external element,
   axially offsetting the third cylindrical portion from the first cylindrical portion,
   disposing the third cylindrical on an end of the first cylindrical portion opposite the second cylindrical portion,
   forming the first, second, and third cylindrical portions as one piece, and
   forming between the male and female threads a portion of a cavity, through which the pressurized fluid flows.

12. The method for the realization of an adapter for a coupling of a quick coupling device for pressurized fluid according to claim 11, further comprising the step of flush matching an external surface of the coupling to an outer surface of the first cylindrical portion.

* * * * *